(12) United States Patent
Basavarajappa

(10) Patent No.: US 10,547,911 B2
(45) Date of Patent: Jan. 28, 2020

(54) USER-CUSTOMIZABLE REMINDER NOTIFICATIONS FOR SOON-TO-BE-RELEASED AND NEWLY-AVAILABLE MEDIA CONTENT

(71) Applicant: SLING MEDIA PVT LTD, Bengaluru (IN)

(72) Inventor: Rajashekhar M. Basavarajappa, Bangalore (IN)

(73) Assignee: SLING MEDIA PVT LTD, Bengaluru (IN)

( * ) Notice: Subject to any disclaimer, the term of this patent is extended or adjusted under 35 U.S.C. 154(b) by 0 days.

(21) Appl. No.: 15/988,870

(22) Filed: May 24, 2018

(65) Prior Publication Data

US 2019/0364343 A1    Nov. 28, 2019

(51) Int. Cl.
| | |
|---|---|
| *H04N 7/10* | (2006.01) |
| *H04N 21/488* | (2011.01) |
| *H04N 21/472* | (2011.01) |
| *H04N 21/458* | (2011.01) |
| *H04N 21/44* | (2011.01) |

(52) U.S. Cl.
CPC ... *H04N 21/4882* (2013.01); *H04N 21/44016* (2013.01); *H04N 21/458* (2013.01); *H04N 21/47214* (2013.01)

(58) Field of Classification Search
CPC .......... H04N 21/4126; H04N 21/4227; H04N 21/4361; H04N 21/2187; H04N 21/45; H04N 21/44222; H04N 21/4334
USPC ...................... 725/32, 34, 38, 46, 44, 47, 58
See application file for complete search history.

(56) References Cited

U.S. PATENT DOCUMENTS

| | | | |
|---|---|---|---|
| 2005/0204388 A1* | 9/2005 | Knudson | H04N 5/44543 725/58 |
| 2011/0107374 A1* | 5/2011 | Roberts | H04N 5/44543 725/46 |
| 2016/0088359 A1 | 3/2016 | Vaidhyanathan et al. | |

* cited by examiner

*Primary Examiner* — Jivka A Rabovianski
(74) *Attorney, Agent, or Firm* — Lorenz & Kopf LLP (57) ABSTRACT

Devices and methods are provided for generating reminder notifications pertaining to time-sensitive media content. In various embodiments, the method includes the step or process of establishing whether time-sensitive media content is desirably viewed by an end user of the media receiver. If establishing that time-sensitive media content is desirably viewed by the end user, it is further determined whether a reminder notification should be generated for the time-sensitive media content at a specified time relative to a change in availability of the time-sensitive media content from a media content provider. If further determining that a reminder notification should be generated for the time-sensitive media content, the reminder notification is generated at the specified time; e.g., the media receiver may generate the reminder notification itself or transmit instructions to a user-carried electronic device to generate the notification reminder.

20 Claims, 5 Drawing Sheets

USER-CUSTOMIZABLE REMINDER NOTIFICATIONS FOR SOON-TO-BE-RELEASED AND NEWLY-AVAILABLE MEDIA CONTENT

TECHNICAL FIELD

The following generally relates to media content systems, and, more particularly, to devices and methods for generating user-customizable reminder notifications pertaining to time-sensitive (soon-to-be-released, newly-available, and/or soon-to-be-removed) media content.

Abbreviations

Abbreviations appearing relatively infrequently in this document are defined upon initial usage, while abbreviations appearing more frequently in this document are defined below.

CDN—Content delivery network;
DVR—Digital video recorder;
EPG—Electronic program guide;
GUI—Graphical user interface;
I/O—Input/output;
OTT—Over-the-top;
STB—Set-top box;
TV—Television; and
VOD—Video-on-demand.

BACKGROUND

Media content, including VOD and TV programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and OTT TV providers, as well as entities owning or operating streaming video platforms. It is also now commonplace for end users to placeshift media content stored in memory contained in or accessible to a home media receiver, such as an STB located at the end user's residence, over a network for viewing on a smartphone, tablet, or other portable media receiver operated by the end user.

Generally, the various options for delivery of media content have greatly increased user convenience in selecting and viewing different types of media content. Concurrently, the wide variety and number of such media content providers have also rendered it increasingly difficult for end users to effectively maintain awareness of all media content available for viewing at any particular juncture in time. This is particularly true as certain media content items (e.g., movies or episodic series) are initially availed for viewing by one or more media content providers, but not others. Consequently, when media content desirably viewed by an end user initially becomes available via cable, satellite, or OTT TV broadcast, there exists an undesirably high likelihood that the end user may inadvertently miss the premiere showing of the newly-broadcast media content. Similarly, an end user may be unaware when media content, which is of interest to the end user, initially becomes available for viewing on a particular streaming video platform. As a still further possibility, an end user may become aware that media content is impending removal from a streaming video platform only following removal of the media content. This is particularly problematic as media content providers operating streaming video platforms, such as NETFLIX®, tend to introduce a substantial amount of new content each month, while removing other content at various intervals throughout the month.

There thus exists an ongoing demand for devices and methods for enhancing user awareness of time-sensitive (soon-to-be-released, newly-available, and/or soon-to-be-removed) media content, which is of interest to end users. Ideally, such devices and methods would provide intuitive and useful tools for generating reminder notifications advising end users of changes in the availability of such time-sensitive media content and, perhaps, providing related functionalities allowing end users to customize the notifications and/or take other actions decreasing the likelihood of an end user missing or becoming unable to view content of interest. Other desirable features and characteristics of embodiments of the present invention will become apparent from the subsequent Detailed Description and the appended Claims, taken in conjunction with the accompanying drawings and the foregoing Background.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Devices and methods for selectively generating reminder notifications for soon-to-be-released, newly-available, and soon-to-be-removed media content (collectively, "time-sensitive media content") are provided. In particular, the reminder notifications are generated to advise users of changes in the availability of high interest media content for viewing from one or more media content providers. The term "high interest media content," as appearing herein, referring to media content determined to be of interest to and desirably viewed by the end user of a media receiver.

A given reminder notification may inform an end user that high interest media content will soon become available for viewing from a particular media content provider. This may be particularly beneficial when the high interest media content is scheduled to premiere as broadcast TV programming delivered over a cable, satellite, or OTT TV distribution system. Alternatively, a reminder notification may inform an end user that certain high interest media content has recently been made available for viewing from at least one media content provider; e.g., in the case of a provider operating a streaming video platform, the reminder notification may alert the user that the high interest content has recently been released or made available for viewing on the streaming video platform. As a still further possibility, reminder notifications may be generated to inform end users that high interest media content will soon be removed from a particular streaming video platform and, therefore, no longer available from viewing via the video platform. In either or both of these latter cases, generation of the notification reminder may further be dependent upon whether an end user subscribes to the video streaming platform, as may be determined from user data stored in memory contained in or accessible to the media receiver. Generally, then, the reminder notifications decrease the likelihood that the end user will inadvertently fail to view (or record) high interest media content in a timely manner. The overall user experience may thus be enhanced in managing media content availed across various platforms and supplied from multiple providers.

When generated, the reminder notifications can assume various forms and can be delivered to any number and type of consumer devices operated by end users. For example, in certain embodiments, the reminder notifications may be generated as email communications; as text messages transmitted in short messaging service (SMS) or multimedia messaging service (MMS) formats; or as push notifications transmitted to a portable electronic device or user-carried media receiver, such as an end user's smartphone, laptop, or tablet. In other instances, the reminder notifications may be presented via a home media receiver, such as an STB; or via a portable media receiver, such as a smartphone or tablet executing a software application for selecting and viewing streaming media content, possibly placeshifted media content. Various aspects of the reminder notifications may be user-customizable, such as the frequency and format of the notifications, as well as the conditions under which the notifications are generated.

Embodiments of the present disclosure may provide other functionalities in addition to the generation of reminder notifications. For example, when high interest media content is presented via satellite, cable, or OTT TV broadcast, an interface element contained in the reminder notifications may allow a user to set a DVR (or other recording device containing computer-readable mass storage) to record the media content upon initial broadcast. Further, if desired, an additional notification can generated when the media content is successfully recorded; and, in instances in which the recording is captured in a computer-readable storage medium accessible by a home media receiver (e.g., an STB) having placeshifting capabilities, visual reminders or cues may further be generated on a portable electronic device or user-carried media receiver, such as a smartphone or tablet, indicating that the newly-stored media content is now available for viewing by placeshifting to the user-carried media receiver. Such a recording interface option may also be desirably produced in conjunction with reminder notifications informing end users of media content soon-to-be-removed from streaming video platforms. Additional description of such supplemental functionalities is provided below. First, however, a general description of a media dissemination system including multiple electronic devices or media receivers suitable for carrying-out embodiments of the present discourse is provided in conjunction with FIG. 1.

Figure 1:
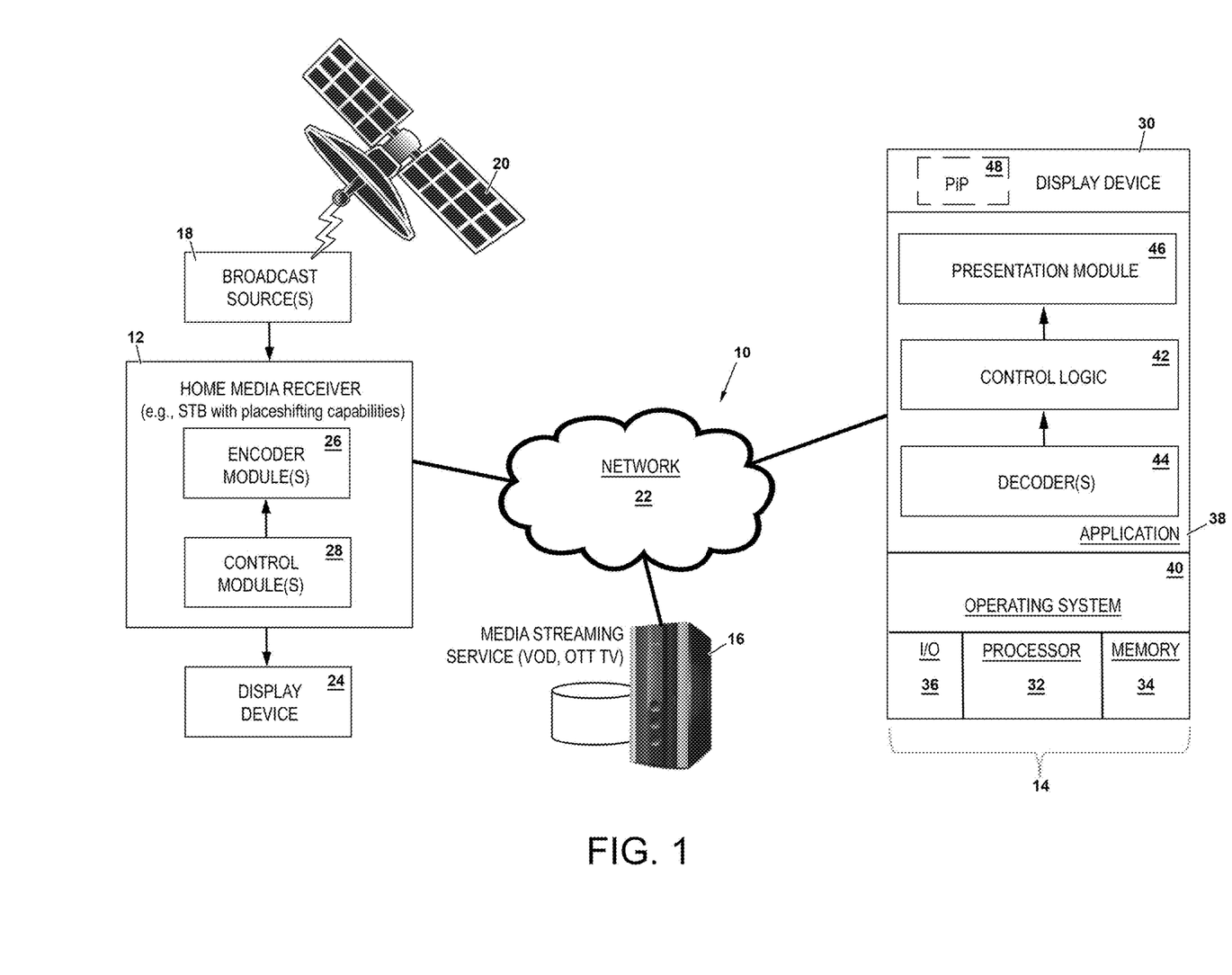
FIG. 1 is a schematic of a media transmission system including two media receivers (e.g., a home media receiver and a portable media receiver, such as a smartphone) suitable for carrying-out embodiments of the present disclosure.

FIG. 1 schematically illustrates a media transmission architecture or system 10 suitable for carrying-out embodiments of the present disclosure, as depicted in accordance with an embodiment of the present disclosure. In the illustrated example, system 10 includes a home media receiver 12, a user-carried or portable media receiver 14, and at least one commercial media streaming service 16. Home media receiver 12 may assume the form of an STB or a similar electronic device, which receives media content from one or more broadcast sources or media content providers 18. For example, as indicated in FIG. 1, broadcast sources/content providers 18 may include a satellite 20, which provides a feed received by a non-illustrated satellite antenna further included in sources 18 and supplied to home media receiver 12. Additionally or alternatively, broadcast sources 18 may include cable TV delivery means, such as optical fiber or co-axial cable; and/or delivery of OTT TV through a data transmission network 22, such as the Internet. In still further embodiments, home media receiver 12 may receive media content transmitted over network 22 and provided by, for example, media streaming (e.g., VOD) service 16 or another placeshifting device (not shown). Home media receiver 12 may receive, decode, and generate output signals for such media content, which may then be presented on a display device 24 (e.g., a home TV set or monitor) for viewing by an end user.

In contrast to home media receiver 12, portable media receiver 14 may be any portable electronic device capable of receiving streaming media content over network 22. In certain embodiments, receivers 12, 14 may communicate over network 22, with home media receiver 12 serving as a placeshifting device providing streaming content to portable media receiver 14. In such implementations, home media receiver 12 (e.g., an STB located in a user's residence) may transmit streaming media content to portable media receiver 14 (e.g., a smartphone or tablet) for viewing by an end user. Media content may be initially recorded or stored in a memory accessible to home media receiver 12; e.g., a computer-readable storage area contained in receiver 12 or an external memory coupled to receiver 12 via a wired or wireless (home network) connection. Alternatively, the pertinent media content may be transmitted to home media receiver 12 and then placeshifted to portable media receiver 14 by receiver 12 as the content is received. When providing such a placeshifting functionality, home media receiver 12 may further contain at least one encoder module 26 and control module 28. Modules 26, 28 can be implemented utilizing software, hardware, firmware, and combinations thereof. The encoded media stream generated by receiver 12 will typically contain both video and audio component streams, which may be combined with packet identification data. Any currently-known or later-developed packetized format can be employed by receiver 12 including, but not limited to, MPEG, QUICKTIME, WINDOWS MEDIA, and/or other formats suitable for streaming transmission over network 22.

The foregoing components can each be implemented utilizing any suitable number and combination of known devices including microprocessors, memories, power supplies, storage devices, interface cards, and other standardized components. Such components may include or cooperate with any number of software programs or instructions designed to carry-out the various methods, process tasks, encoding and decoding algorithms, and relevant display functions. Media transmission system 10 may also include various other conventionally-known components, which are operably interconnected (e.g., through network 22) and not shown in FIG. 1 to avoid unnecessarily obscuring the drawing. Network 22 may encompass any number of digital or other networks enabling communication between receiver 12, receiver 14, and/or media streaming service 16 utilizing common protocols and signaling schemes. In this regard, network 22 can include one or more open CDNs, Virtual Private Networks (VPNs), the Internet, and various other networks implemented in accordance with TCP/IP protocol systems or other conventional protocols. Network 22 may also encompass one or more wired or Local Area Networks (LANS), Wide Area Networks (WANs), a cellular network, and/or any other pubic or private networks.

As indicated above, portable media receiver 14 can assume the form of any electronic device suitable for performing the processes and functions described herein. A non-exhaustive list of suitable electronic devices includes smartphones, wearable devices, tablet devices, laptop computers, and desktop computers. When engaged in a placeshifting session with home media receiver 12, portable media receiver 14 outputs visual signals for presentation on display device 30. Display device 30 can be integrated into portable media receiver 14 as a unitary system or electronic device. This may be the case when, for example, portable media receiver 14 assumes the form of a mobile phone, tablet, laptop computer, or similar electronic device having a dedicated display screen. Alternatively, display device 30 can assume the form of an independent device, such as a freestanding monitor or television set, which is connected to portable media receiver 14 via a wired or wireless connection. Any such video output signals may be formatted in accordance with conventionally-known standards, such as S-video, High Definition Multimedia Interface (HDMI), Sony/Philips Display Interface Format (SPDIF), DVI (Digital Video Interface), or IEEE 1394 standards, as appropriate.

By way of non-limiting illustration, portable media receiver 14 is shown in FIG. 1 as containing at least one processor 32, an associated memory 34, and a number of I/O features 36. I/O features 36 can include various different types of interfaces, such as a network interface, an interface to mass storage, an interface to display device 30, and any number of user input interfaces. Portable media receiver 14 may execute a software program or browser player 38 directing the various hardware features of portable media receiver 14 to perform the functions described herein. Browser player 38 suitably interfaces with processor 32, memory 34, and I/O features 36 via any conventional operating system 40 to provide such functionalities. Software application can be placeshifting application in embodiments in which home media receiver 12 assumes the form of a STB, DVR, or similar electronic device having placeshifting capabilities. In such embodiments, home media receiver 12 will typically be located within the residence of the end user, although this not strictly necessary. In certain realizations, portable media receiver 14 may be implemented utilizing special-purpose hardware or software, such as the SLINGCATCHER-brand products available from SLING MEDIA INC. currently headquartered in Foster City, Calif.

Browser player 38 includes control logic 42 adapted to process user input, obtain streaming content from one or more content sources, decode received content streams, and provide corresponding output signals to display device 30. In this regard, control logic 42 may establish a data sharing connection with the remote home media receiver 12 enabling wireless bidirectional communication with control module 28 such that a placeshifting session can be established and maintained. During a placeshifting session, home media receiver 12 streams placeshifted content to portable media receiver 14 over network 22. Such streaming content can contain any visual or audiovisual programming including, but not limited to, streaming OTT TV programming and VOD content. The streaming content is received by portable media receiver 14 and decoded by decoding module 44, which may be implemented in hardware or software executing on processor 32. The decoded programming is then provided to a presentation module 46, which generates output signals to display device 30 for presentation to the end user operating portable media receiver 14. In some embodiments, presentation module 46 may combine decoded programming (e.g., programming from multiple streaming channels) to create a blended or composite image; e.g., as schematically indicated in FIG. 1, one or more Picture-in-Picture (PiP) images 48 may be superimposed over a main or primary image generated on a screen of display device 30.

In operation, control logic 42 of portable media receiver 14 obtains programming in response to end user input or commands received via a user interface, such as a touchscreen or keyboard interface, included within I/O features 36. Control logic 42 may establish a control connection with remotely-located home media receiver 12 via network 22 enabling the transmission of commands from control logic 42 to control module 28. Accordingly, home media receiver 12 may operate by responding to commands received from a portable media receiver 14 via network 22. Such commands may include information utilized to initiate a placeshifting session with home media receiver 12, such as data supporting mutual authentication of home media receiver 12 and portable media receiver 14. In embodiments in which home media receiver 12 assumes the form of a consumer placeshifting device, such as an STB or DVR located in an end user's residence, control commands may include instructions to remotely operate home media receiver 12 as appropriate to support the current placeshifting session.

Figure 2:
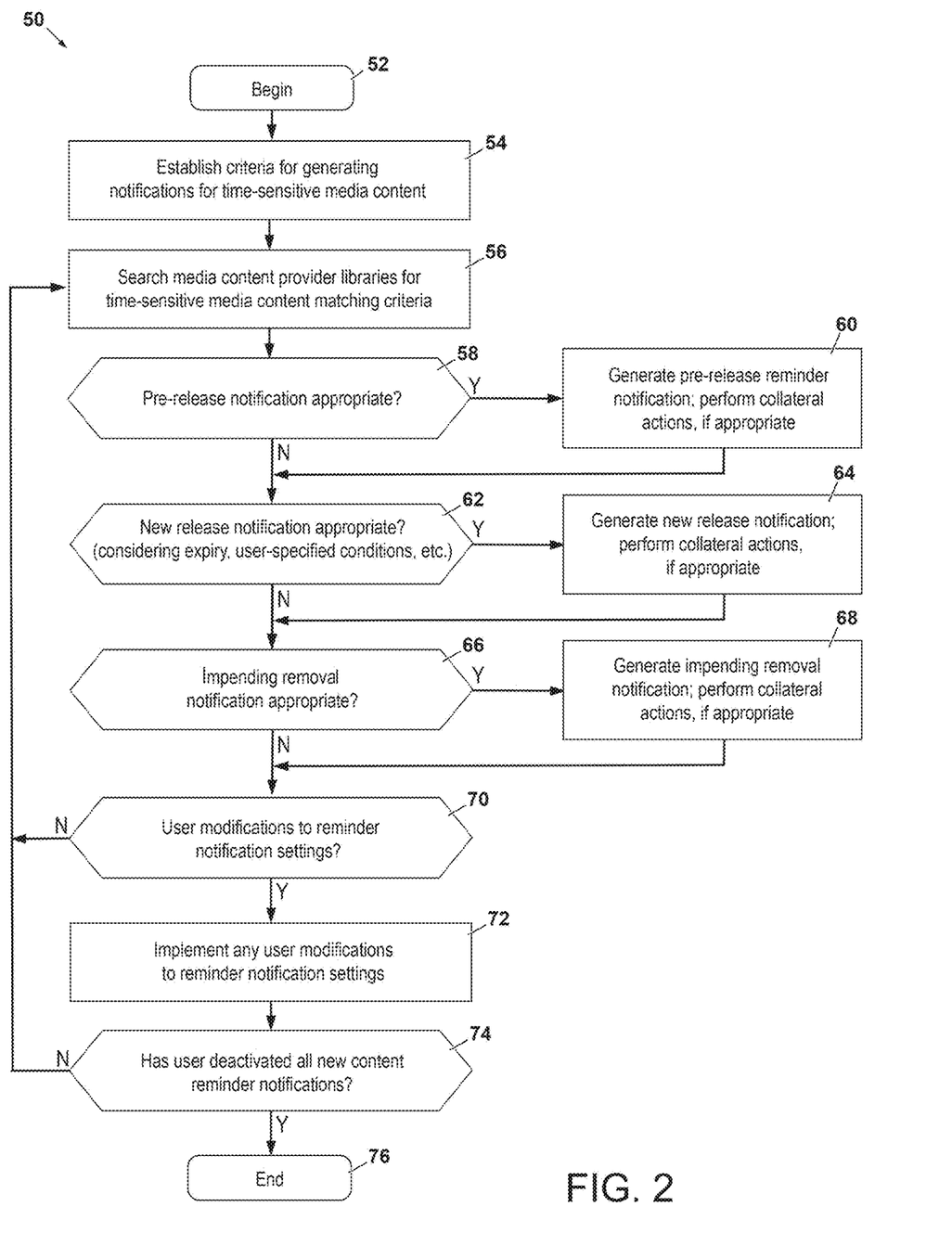
FIG. 2 is a flowchart of a method for generating user-customizable reminder notifications pertaining to time-sensitive media content, as illustrated in accordance with an exemplary embodiment of the present disclosure.

Advancing to FIG. 2, there is shown a method 50 for selectively generating reminder notifications pertaining to time-sensitive media content (soon-to-be-released, newly-available, and/or soon-to-be-removed media content), as illustrated in accordance with an exemplary embodiment of the present disclosure. Method 50 is referred to more fully below as "time-sensitive content notification method 50" and can be carried-out by home media receiver 12, by portable media receiver 14, or by receivers 12, 14 operating in cooperation. As indicated in FIG. 2, time-sensitive content notification method 50 includes a number of steps or processes identified as STEPS 52, 54, 56, 58, 60, 62, 64, 66, 68, 70, 72, 74, 76. Each of these process steps are described, in turn, below. The steps shown in FIG. 2 and described below are offered by way of non-limiting example only. In alternative embodiments of method 50, additional process steps may be performed, certain steps may be omitted, and/or the illustrated steps may be performed in varying sequences.

After commencing (STEP 52), time-sensitive content notification method 50 advances to STEP 54. During STEP 54, the condition or conditions for creating and issuing time-sensitive media content notifications are initially defined or established. In embodiments, the criteria governing the generation of time-sensitive media content notifications may be defined by user input received via the media receiver (or receivers) conducting method 50 or another electronic device, user profile data indicative of user interest (likes and dislikes), and other such information. To this end, the media receiver may determine user viewing preferences and construct a user profile based, at least in part, on tracked or monitored viewing habits in embodiments. Additionally, in certain instances, a machine learning model (e.g., a neural network or other classification model) may be employed to initially construct the end user profile and then further trained utilizing appropriate data inputs. Such data inputs can include, for example, measurements of similarity to other media content or information extracted from social media content providers (e.g., TWITTER®, FACEBOOK®, WHATSAPP®, and the like) determined to be of interest to an end user.

Further, at STEP 54 of method 50, the media receiver determines whether reminder notifications should be generated for time-sensitive media content corresponding to the user's established viewing preferences. In implementations, media receiver may make this determination based upon user input data, with the receiver performing method 50 potentially prompting or soliciting the end user for entry of such data. For example, if a user views a predetermined number of media content episodes in a series (e.g., four or more episodes in the current season of a program), the client media receiver may generate a user query or prompt inquiring as to whether reminder notifications are desirably generated for further episodes of the media content. Such a query may also solicit user input regarding the timing of such notification reminders relative to the availability of the media content for viewing from one or more content providers; e.g., user input specifying whether reminder notifications are desirably generated prior to release of the high interest media content, generated when the high interest media content is first broadcast or becomes available for viewing (e.g., via release on a streaming video platform), prior to removal of the media content from a streaming video platform, or any combination thereof.

In embodiments, the media receiver (or receivers) conducting method 50 may further solicit user input specifying whether reminder notification should be generated for time-sensitive content sharing one or more characteristics in common with media content previously viewed by the end user, such as a recently-viewed episodic series, movie, or the like. For example, if recently-viewed media content was of a particular genre (e.g., comedy, drama, horror, or suspense), the media receiver may inquire whether reminder notifications should be created for time-sensitive media content classified within the same genre (e.g., comedy, drama, horror, or suspense). Further, in certain realizations of method 50, the media receiver may only inquire as to whether reminder notifications should be generated for time-sensitive content sharing multiple characteristics or parameters with the recently-concluded media content; e.g., sharing a first characteristic (e.g., the same genre) and sharing a second characteristic (e.g., lead actor or actresses) in common. In still other embodiments, the media receiver may generate such a user prompt or inquiry requesting user input, which specifies whether reminder notifications are desirably created, in response to other types of user actions. For example, if an end user should assign a particular program, movie, or other content item a highly favorable rating (e.g., five out of five stars) utilizing the media receiver conducing method 50 or another device, the media receiver may inquire as to whether the user wishes to create time-sensitive content reminder notifications for a related program, movie, or other media content item.

The above-described exemplary approach for generating time-sensitive content notifications may be particularly useful when, for example, a season of an episodic series has just concluded. In this case, immediately after conclusion of the final episode in the current season of the program, the media receiver may solicit user input instructing whether reminder notifications should be generated prior to and/or immediately following release of the next season of the episodic series. For example, if the user viewed the last episode of the series in question utilizing home media receiver 12 (FIG. 1), receiver 12 may generate this prompt and a user may respond utilizing a remote control or any other suitable interface for entering data into receiver 12. Similarly, if the user viewed the last episode utilizing portable media receiver 14 (FIG. 1), receiver 14 may generate this prompt and an end user may respond by entry of input utilizing an appropriate interface, such as a touchscreen interface when receiver 14 assumes the form of a smartphone or tablet. A combination of these approaches can also be applied. For example, in a scenario in which a user recently completed viewing of the final episode in a series utilizing home media receiver 12 (FIG. 1), user data inquiries can be generated on portable media receiver 14; e.g., in response to instructions received from receiver 12 and transmitted to receiver 14 over network 22. User input data can then be entered through receiver 14 and relayed to receiver 12 via network 22.

Embodiments of time-sensitive content notification method 50 beneficially enable a user to select any practical number and type of criteria to govern the creation and issuance of time-sensitive content reminder notifications. As indicated above, in basic implementations, a single criterion may govern the generation of reminder notifications. For example, user input data may specify that reminder notifications should be created for soon-to-be-released, newly-available, or soon-to-be-removed content in the form of a particular episodic series, a feature film, a particular actor or actress, new programs appearing on a particular television channel, all new sporting events feature a particular athlete (e.g., all upcoming golf tournaments in which a particular golfer participates), all new episodic series falling within a particular genre, all new movies falling within a particular genre, and so on. In more complex implementations, multiple factors may be considered in determining when to schedule and issue reminder notifications. For example, reminder notification may only be generated for sporting events in which two user-specified or flagged teams are participating, as may be the case when a particular sports rivalry occurs. As another example, an end user may input data specifying whether reminder notifications should be generated for a particular type of content (e.g., movies) falling within a particular genre (e.g., comedy) and featuring a particular actor or actress, as indicated above. As a still further example, an end user interested in home purchase show may request notifications only for new episodes in which homes where purchased in a particular region of the United States, providing such information can be determined from the media receiver; e.g., by extracting such information from an EPG, a program description, or another source accessible to the receiver, as discussed below. Various other criteria for governing the generation of reminder notifications are also possible.

In embodiments, the media receiver (or receivers) conducting method 50 usefully compiles information from various sources in ascertaining new program notification criteria. For example, the media receiver may extract rating or review information from a particular streaming service or an online platform or website maintaining user rating data. As a more specific example, and utilizing a 5-star rating system, a user may provide input specifying that reminder notifications should be generated for soon-to-be-released or newly-available content having a particular minimum star rating; e.g., an average star rating of 4.25 stars or more. If providing reminder notifications for a streaming video media content provider, such as NETFLIX® or AMAZON® STREAMING VIDEO, having a star rating system, the media receiver may simply utilizing the existing star rating system for this criteria; e.g., a user may specify that time-sensitive media content notification should be generated for new programming on NETFLIX® of a particular type (e.g., movies) and genre (e.g., comedy) having a specified minimum star rating. In other instances, rating information may be extracted from an independent or third party rating platform, such as ROTTEN TOMATOES®. This latter approach may be particularly useful when the media receiver desirably issues reminder notifications for premiere broadcasts of content or programming (e.g., via cable, satellite, or OTT TV distribution) matching user interests. For example, in embodiments, a user may specify that reminder notifications are desirably generated for all new movies of a particular type (e.g., comedy) satisfying a particular rating threshold (e.g., having an 80% or greater approval rating on ROTTEN TOMATOES®) prior to the initial broadcast of such movies via broadcast sources 18 (FIG. 1).

The media receiver carrying-out method 50 usefully considers a range of content sources or providers when determining when to generate reminder notifications for time-sensitive media content. Commonly, an end user may subscribe to multiple streaming services, such as one or more of NETFLIX®, AMAZON STREAMING VIDEO®, and other VOD services. In certain instances, the end user may also subscribe to a cable or satellite TV broadcast service and/or to an OTT TV service, such as an OTT TV service offered by DirectTV®, DISH NETWORK SLING TV®, SONY PLAYSTATION VIEW®, HULU®, YOUTBUE TV®, or the like. By searching multiple such media content providers for time-sensitive media content, the media receiver performing method 50 can improve user management of such multiple media content providers in an intuitive and easy-to-use manner. In the case of soon-to-be-released content, in particular, one or more streaming video platforms to which the end user subscribes may be initially identified; e.g., by extracting such information from a user profile. Reminder notifications may then be generated in response to determining that time-sensitive media content, which is of high interest to an end user, is pending release on a streaming video platform to which the user subscribes.

In certain instances, method 50 may enable a user to specify whether reminder notification are desirably generated for content requiring an additional fee or payment to view, beyond any subscription fee already paid by the user (referred to herein as a "one-time fee"). For example, in the case of AMAZON STREAMING VIDEO®, certain newly-released content may be viewed free of cost for subscribers of the AMAZON PRIME® service, while other newly-released media content may require purchase or payment of a rental fee to view the high interest media content. In this case, embodiments of method 50 may enable a user to select whether reminder notifications should be generated for such content requiring the payment of an additional fee or one-time payment to view. Thus, in such embodiments, the media receiver conducting method 50 may determine whether payment of a one-time fee is required to view the time-sensitive media content; if payment of a on-time fee is required, further determine from user data (e.g., pre-specified user preferences) whether reminder notifications should be generated for media content requiring the payments of one-time fees to view; and then generate the reminder notification accordingly.

In the case of live events, the media receiver conducting time-sensitive content notification method 50 may further provide selection criteria based upon the outcome of or other conditions developing during the course of the live event. For example, for certain games in the OLYPMICS®, a user may be able to specify during STEP 54 to only provide reminders when a particular country wins a medal. In this case, method 50 may also involve recording the live event at the media receiver, if capable. At the conclusion of the live event, it may be determined whether the specified condition or criteria was satisfied; e.g., by retrieval of data via network 22. The newly-recorded content may be erased if it is determined that the criteria is not satisfied. Alternatively, if the criteria was satisfied, the program may be retained and a reminder notification of the newly-available content may be presented to the user. For example, in an embodiment in which home media receiver 12 has recording and streaming or placeshifting capabilities, an alert (e.g., in the form of a text message or push notification) may be transmitted to portable media receiver 14 (e.g. a user's tablet or smartphone) indicating, for example, "The United States has just won gold in snowboarding at the 2017 Winter Olympics. This event has been recorded and can be accessed for viewing anytime using your streaming application." Analogous criteria can be specified for other live sporting events, such as if a particular team or player wins a particular game or tournament or for other types of live event; e.g., a political speech may only be retained and a notification generated if the speech surpasses a particular NIELSEN® rating, TWITTER® trend threshold, or the like.

In yet further embodiments of time-sensitive content notification method 50, an end user may, independently and without being prompted by the media receiver (or receivers) conducting method 50, enter user data specifying when and if reminder notifications are desirably scheduled, as well as the conditions governing the generation of reminder notifications. To this end, the media receiver performing method 50 may provide a GUI allowing an end user to set various conditions pertaining to such reminder notifications. In the case of home media receiver 12, for example, an STB GUI may have a menu hierarchy through which a user may navigate to a window or page providing such reminder notification settings. Similarly, in the case of portable media receiver 14, software application 38 may provide a menu or page for registering for and adjusting settings pertaining to reminder notifications. As a still further possibility, a webpage or online portal can be provided and accessed utilizing receivers 12, 14 or another network-connected electronic device. In this case, the webpage or portal may enable an end user to register for reminder notifications, change related settings, define or refine the end user's profile or viewing preferences, and provide other such information.

Figure 3:
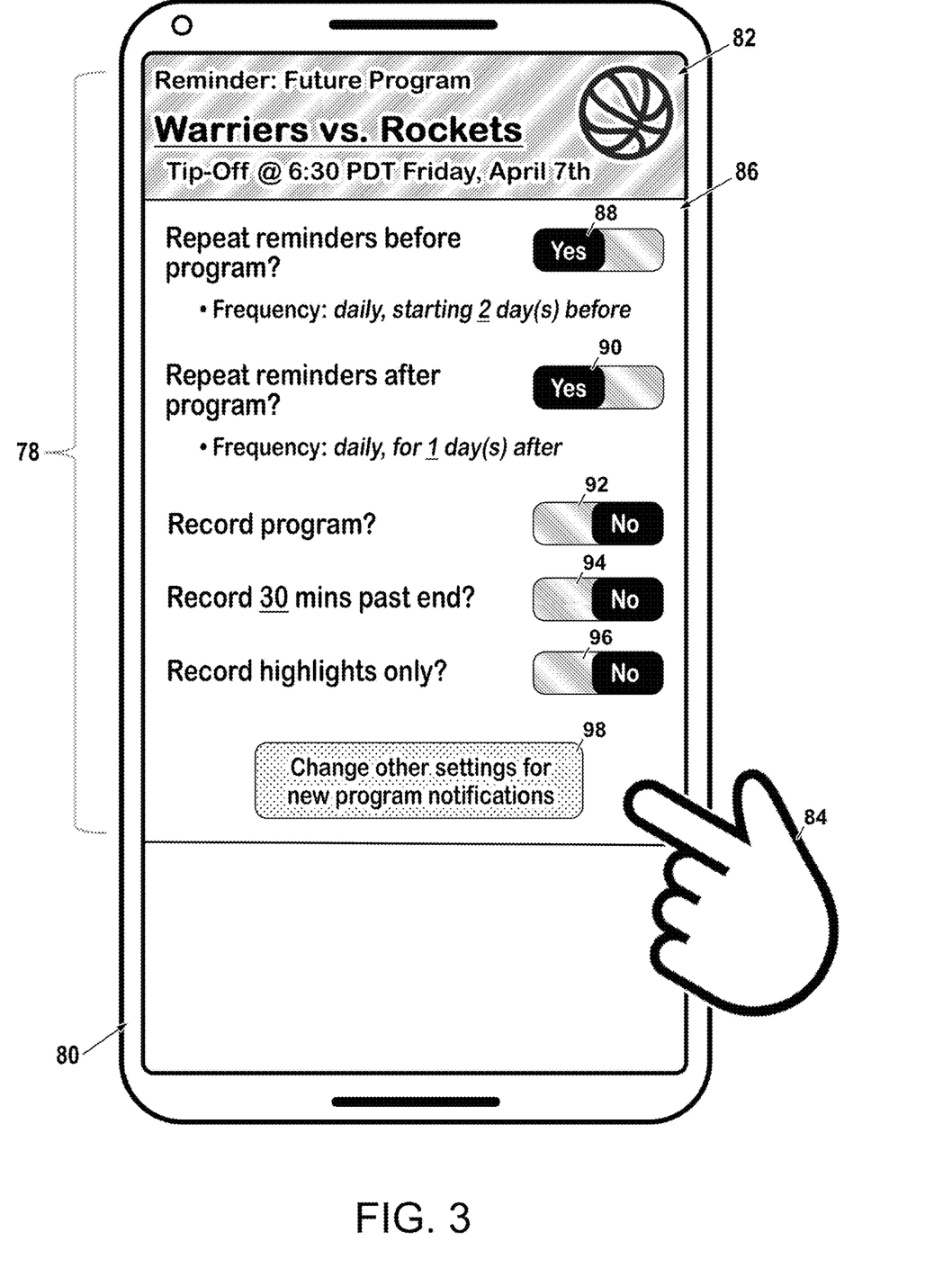
FIGS. 3-5 are screenshots of exemplary reminder notifications that may be generated by a media receiver, such as the STB or portable electronic device shown in FIG. 1, when implementing the method of FIG. 2.
Figure 4:
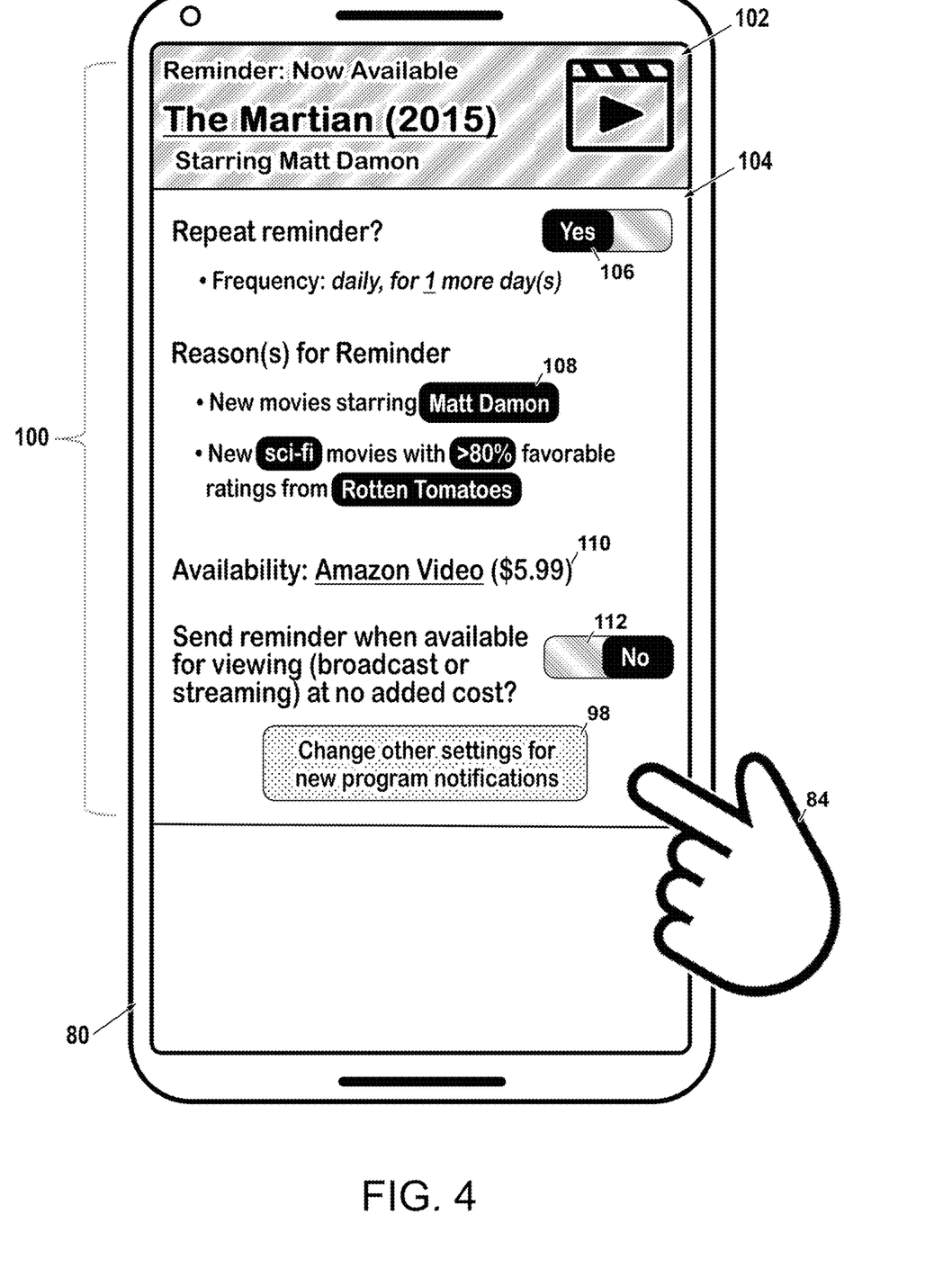

In various embodiments, a user can specify various other criteria regarding the reminder notifications during STEP 54 of method 50. For example, a user may also be permitted to choose the time window and frequency with which such notification are generated. In the case of pre-release notification, a user may be able to select when the first notification is generated (e.g., one week prior to release of the content, whether by premiere broadcast or made newly-available for streaming consumption), whether subsequent notifications should be issued, and the frequency of such notifications, as indicated in the example of FIG. 3 below. Similarly, in the case of post-release notifications, a user may determine the time period over which any additional notifications should be generated and the frequency of such notifications, as indicated in the example of FIG. 4 below. An end user may also be permitted to set various other parameters or aspects pertaining to the reminder notifications, such whether such notifications are sent via text message (e.g., SMS or MMS), as push notifications (e.g., transmitted to portable media receiver 14), as email communications, as messages presented only when a particular streaming application or STB GUI interface is executed, and so on.

With continued reference to FIG. 2, method 50 advances to STEP 56 after establishing the time-sensitive content notification criteria. At STEP 56, the media receiver (or receivers) conducting method 50 (e.g., receiver 12 and/or receiver 14 shown in FIG. 1) searches informational sources to ascertain whether an upcoming or newly-available content satisfies the established time-sensitive content notification criteria. Such information sources can include an information extracted from an EPG in the case of broadcast media, information extracted from metadata or content descriptions in the case of VOD content, information extracted from other online sources or services accessible via network 22 (e.g., content tables or sources describing scheduled programming), and any other relevant sources. Afterwards, the extracted information is compiled, analyzed, and utilized to determine whether a reminder notification should be generated for any soon-to-be-released content of user interest (STEP 58). If determining that time-sensitive media content reminder notification should be generated, the media receiver advances to below-described STEPS 60, 64, or 68, as appropriate, and generates such a reminder notification. The particular manner in which the reminder notification is issued will vary depending upon the media receiver performing method 50 and the type of notification desirably generated. For example, in realizations in which media receiver 12 carries-out method 50, media receiver 12 may utilize network 22 to transmit a push notification, an email, or a similar electronic message to a user's smartphone or tablet (which, again, may function as media receiver 14 in FIG. 1).

FIG. 3 is a screenshot of reminder notification 78, which can be generated on a smartphone 80 during STEP 60 in an exemplary implementation of method 50. Smartphone 80 may correspond to user-carried media receiver 14 shown in FIG. 1, although it should be appreciated that variations of reminder notification 78 can be generated on other types of user-carried media receivers and home media receivers, such as media receiver 12 shown in FIG. 1. In this example, reminder notification 78 includes a top-level readout or marquee 82 informing an end user of the upcoming premiere broadcast of a media content item, here a sporting event. Top-level readout 82 is usefully presented as a push notification briefly appearing on the display of smartphone 80 regardless of which applications are currently being executed thereby. By interacting with top-level readout 82 in some manner, such as by touching readout 82 and then dragging downwardly toward the bottom of the screen (represented by touch symbol 84), a user can summon a second level window 86 presenting additional information and selectable options pertaining to the reminder notification. In this example, a user can interact with an interface element or widget 88 (here, a virtual slider) to select whether additional reminders are generated by the media receiver, noting that the frequency of the reminders may be selected by touching the underlined "2" in FIG. 3 and selecting a different number utilizing a dropdown menu (not shown).

Additional setting options may likewise be presented in conjunction with or as part of exemplary reminder notification 78 shown in FIG. 3. As illustrated, these options can include whether repeat reminders are desired after occurrence of the content item or sporting event (e.g., as set by user interaction with a virtual switch or slider 90), whether to record the program (e.g., set by a virtual slider 92), whether the user wishes to record the program beyond its scheduled conclusion to, for example, capture any overtime or post-game analysis (e.g., as set by a virtual slider 94); and whether the user wishes to only record highlights of the game (e.g., as set by a virtual slider 96). An interface element or widget 98 (here, a virtual button) is also provided in conjunction with notification 78 and enables an end user to adjust further settings pertaining to the depicted reminder notification or other reminder notifications. Various other options or interface elements can be included in reminder notification 78 in further embodiments, such as an option to add the upcoming scheduled broadcast to a user's calendar in a manner similar to that discussed below in conjunction with FIG. 5.

Referring once again to FIG. 2, the media receiver executing time-sensitive content notification method 50 next advances to STEP 62. During the process step, the media receiver (or receivers) conducting method 50 determine whether a reminder notification is properly generated for any media content recently made available for viewing by one or more content providers, such as media content recently availed on NETFLIX®, HULU®, AMAZON STREAMING VIDEO®, or another VOD media content provider for streaming consumption. If this query is answer in the negative, the media receiver preforming time-sensitive content notification method 50 progresses to STEP 66. Alternatively, if this query is answered in the positive, the media receiver conducting method 50 instead advances to STEP 64 and generates the appropriate reminder notification. Additionally, at STEP 64, the media receiver may perform or commence performance of any collateral actions associated with the reminder notification; e.g., the media receiver may flag the media content for recording upon any subsequent broadcast or for recording prior to removal from a streaming video platform.

FIG. 4 is a screenshot of an exemplary post-release reminder notification 100, which may be generated on a portable electronic device (e.g., smartphone 80) during STEP 64 of method 50. In this case, reminder notification 100 pertains to a movie (here, the "MARTIAN" starring Matt Damon), as indicated by top-level or marquee readout 102. A second level menu 104 is further shown and, once again, includes a virtual slider 106 with which a user can interact to adjust reminder settings. Reasons underlying the generation of the reminder are also presented or textually annunciated in this example, with highlighted text 108 indicating textual fields that can be changed by the user; e.g., by verbal or typed entry. A data field 110 further indicates the streaming or VOD media content provider from which the content item is available. As viewing of the content requires payment of a one-time fee (e.g., a rental or purchase fee), a further widget 112 is included in reminder notification 100 to allow a user to receive an additional reminder when the identified movie is available for viewing at no additional cost to the user; e.g., whether available for viewing as part of a subscription package as may if, for example, the movie should become available on a streaming service, satellite TV, cable TV, or OTT TV package to which the user presently subscribes. Finally, as previously the case, a virtual button 98 is further provided to enable a user to change still other settings pertaining to the reminder notifications.

Returning to FIG. 2, and progressing to STEP 66 of time-sensitive content notification method 50, the media receiver next determines whether a reminder notification is desirably generated for any high interest content soon-to-be-removed from a streaming video platform of user interest. During STEP 66, the media receiver (or receivers) conducting method 50 may determine whether high interest media content is pending removal from a streaming video platform utilizing any suitable number and type of data sources. In this regard, it should be noted that many streaming and VOD media content providers publish lists of soon-to-be-removed content a certain time (e.g., one month) prior to removal of the content from their streaming video platforms. Thus, the media receiver conducting method 50 can be provided with this information and then determine if any of the soon-to-be-removed content items correspond with "high interest media content," as previously discussed. If determining that a reminder notification for soon-to-be-removed content of high interest to an end user is appropriately generated, media receiver advances to STEP 68 of method 50 and generates a corresponding reminder notification (an example of which is described below in conjunction with FIG. 5), Otherwise, the media receiver progresses directly to STEP 70 of time-sensitive content notification method 50, as further described below.

Figure 5:
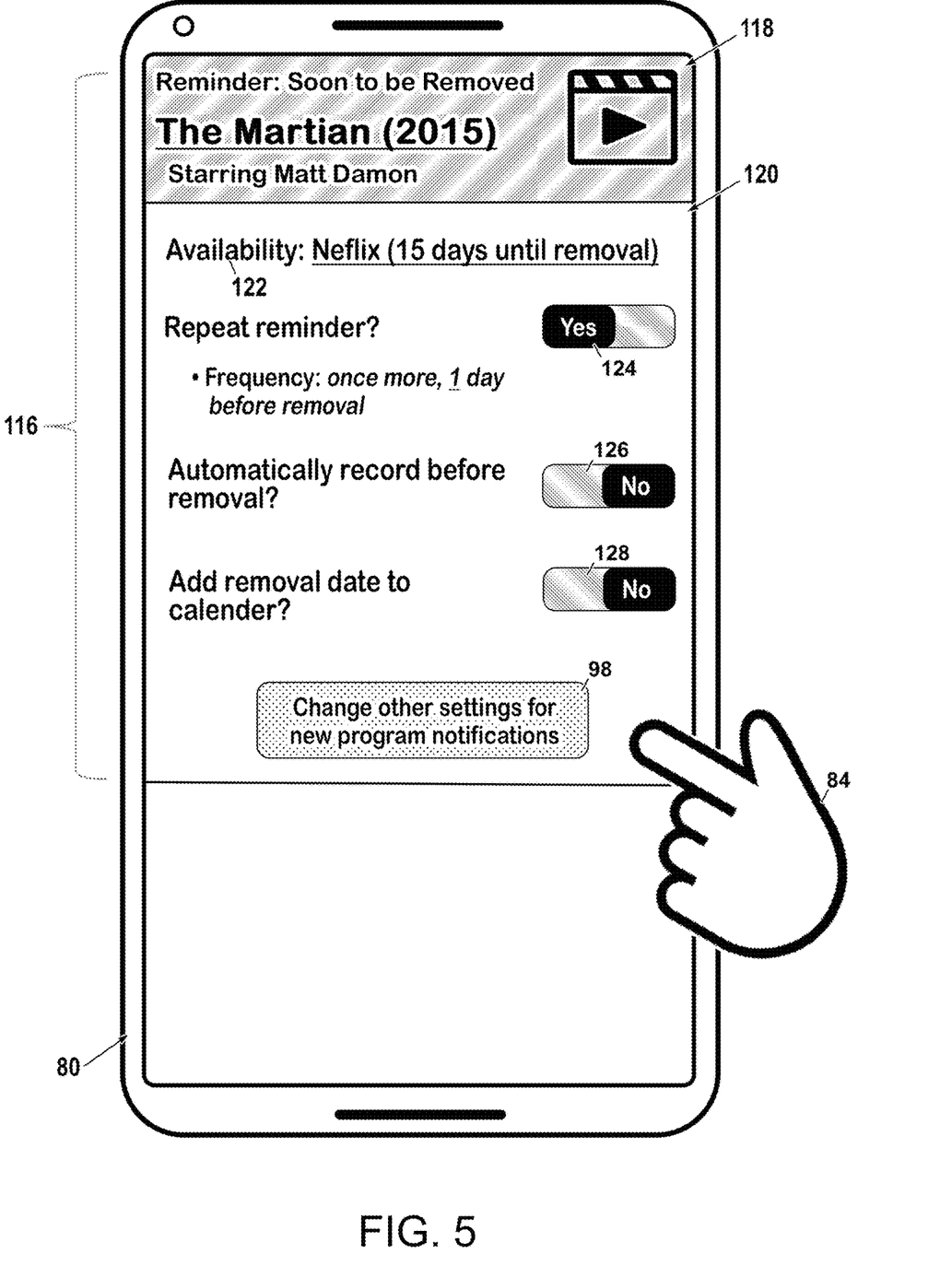

FIG. 5 is a screenshot of an exemplary reminder notification 116, which may be generated on a portable electronic device (e.g., a smartphone 80) during STEP 68. As was reminder notification 100 described above in conjunction with FIG. 4, reminder notification 116 pertains to a movie (here, the "MARTIAN" starring Matt Damon), as indicated by top-level or marque readout 118. However, in this particular example, reminder notification 116 is generated to indicate that the high interest media content is pending removal in the near future. Reminder notification 116 further contains a readout 122 indicating the particular media content media content provider or media content providers on which the identified media content item is presently available for streaming consumption, as well as the time period (here, expressed in days) remaining until the media content item is removed. Once again, interface elements or widgets 124, 126 are provided to allow an end user to specify whether additional reminder notifications should be generated and whether the identified content item should be recorded. Additionally, in this example, a further interface element or widget 128 is provided; and, when selected, adds the removal date of the content to a specified calendar of the end user, such as a calendar maintained on smartphone 80. In alternative embodiments, a similar option can also be provided in conjunction with reminder notification 78 described above in conjunction with FIG. 3 for automatically scheduling the release date of high interest media content to a user's calendar.

Referring once again to FIG. 2, and progressing to STEP 70 of time-sensitive content notification method 50 (FIG. 2), the media receiver carrying-out method 50 next determines whether an end user has modified or wishes to modify the reminder notification settings or options. If determining that the user has not modified the notification settings, the media receiver conducting method 50 returns to STEP 56 and the above-described process steps repeat. Conversely, if determining that the user has modified the notification settings, the media receiver effectuates or enters the user modifications (STEP 72). Afterwards, the media receiver (or receivers) conducting method 50 further determines whether the end user has deactivated all time-sensitive media content notifications (STEP 74). If this is not the case, time-sensitive content notification method 50 again returns to STEP 56 and loops. If, instead, all time-sensitive media content notifications have been deactivated, the media receiver progresses to STEP 72 and method 50 terminates until such time as the user again reactivates one or more time-sensitive media content reminder notifications.

The foregoing has thus provided embodiments of devices and methods for generating reminder notifications pertaining to time-sensitive media content; that is, reminders for content soon-to-be-released by a media content provider accessible to an end user, recently made available for viewing on a media content provider accessible to the end user, or soon-to-be-removed from a media content provider accessible to the end user. Such reminder notifications may be generated at specified times ahead of the change in viewing availability of the high interest media content (e.g., in the case of soon-to-premier and soon-to-be-removed media content) and/or at specified following the change in viewing availability of the media content (e.g., in the case of media content newly-availed for streaming consumption via a streaming video platform). Embodiments of the above-described devices and methods allow a high degree of user customization and can monitor multiple different media content providers. This, in turn, may increase the likelihood that end users are made aware of and view (or record) high interest media content in a timely fashion. The overall user experience in selecting, navigating amongst, and viewing media content choices distributed across multiple different content sources or media content providers is enhanced as a result.

Generally, the above-described methods are carried-out utilizing a media receiver; the phrase "carried-out utilizing a media receiver" denoting that a media receiver is utilized to perform the method, whether in part or in whole. In various embodiments, the method includes the steps or processes of: establishing whether time-sensitive media content is desirably viewed by an end user of the media receiver; if establishing that time-sensitive media content is desirably viewed by the end user, determining whether a reminder notification should be generated for the time-sensitive media content at a specified time relative to a change in availability of the time-sensitive media content from a media content provider; and if determining that a reminder notification should be generated for the time-sensitive media content, generating the reminder notification at the specified time.

The following additional statements may further describe the general embodiment of the method set-forth in the preceding paragraph (as considered in the alternative unless otherwise stated):

(i) determining may comprise determining whether the reminder notification should be generated at a specified time before a premiere broadcast of the time-sensitive media content by the media content provider;

(ii) when the method includes the step or process of romanette (i), the media receiver may assume the form of a home media receiver located in a residence of the end user and the method may further include: (a) providing a user interface element, as part of the reminder notification, for automatically setting a recording of the premiere broadcast of the time-sensitive media content; and (b) scheduling the home media receiver to record the premiere broadcast of the time-sensitive media content when the user interface element is selected or otherwise activated by the end user;

(iii) when the method includes the step or process of romanette (ii), the reminder notification may be generated at a portable or user-carried electronic device (e.g., a smartphone or tablet), which is operated by the end user and which communicates with the home media receiver over a network; and the user-carried electronic device may transmit instructions to the home media receiver over the network to record the premiere broadcast of the time-sensitive media content when the user interface element is activated by the end user;

(iv) determining may comprise determining whether the reminder notification should be generated following release of time-sensitive media content by the media content provider on a streaming video platform;

(v) when the method includes the step or process of romanette (iv), the method may further include: (a) identifying one or more streaming video platforms to which the end user subscribes; and (b) generating the reminder notification in response to determining that the time-sensitive media content is pending release on a streaming video platform to which the user subscribes;

(vi) when the method includes the step or process of romanette (iv), the method may further include: (a) determining whether payment of a one-time fee is required to view the time-sensitive media content; (b) if determining that one-time fee is required to view the time-sensitive media content, further determining from user data whether reminder notification should be generated for media content requiring payment of a one-time fee to view; and (c) generating the reminder notification if the user data indicates that reminder notifications should be generated regardless of whether a one-time fee is required to view the media content;

(vii) determining may comprise determining whether the reminder notification should be generated prior to removal of the time-sensitive media content from a video streaming platform associated with (e.g., owned or operated by) the media content provider;

(viii) when the method includes the step or process of romanette (vii), the media receiver may comprise a home media receiver located in a residence of the end user, and method may further comprise: (a) providing a user interface element, as part of the reminder notification, for automatically scheduling a recording of the time-sensitive media content; (b) scheduling the home media receiver to record the time-sensitive media content prior to removal from the video streaming platform when instructed via user input entered via the user interface element; and (ix) when the method includes the step or process of romanette (viii) the reminder notification may be generated at a user-carried electronic device, which is operated by the end user and which communicates with the home media receiver over a network; and the user-carried electronic device may transmit instructions to the home media receiver over the network to record the time-sensitive media content prior to removal from the video streaming platform when the user interface element is activated by the end user.

In another implementation, the method includes determining whether high interest media content is pending removal from a streaming video platform to which the end user subscribes. If determining that high interest media content is pending removal from a streaming video platform to which the end user subscribes, it is further determined whether a reminder notification should be generated for the high interest media content at a specified time prior to removal of the high interest media content from the streaming video platform. If further determining that a reminder notification should be generated for the high interest media content, the reminder notification is then generated at the specified time; e.g., the media receiver may generate the reminder notification itself or transmit instructions to a user-carried electronic device to generate the notification reminder.

In yet further embodiments, a media receiver includes a processor and a computer-readable storage medium storing a computer-readable code or instructions that, when executed by the processor, causes the media receiver to perform the operations of: establishing whether time-sensitive media content is desirably viewed by an end user of the media receiver; if establishing that time-sensitive media content is desirably viewed by the end user, determining whether a reminder notification should be generated for the time-sensitive media content at a specified time relative to a change in availability of the time-sensitive media content from a media content provider; and if determining that a reminder notification should be generated for the time-sensitive media content, generating the reminder notification to be generated at the specified time. In certain realizations, the media receiver, when the computer-readable code is executed by the processor, may also perform the functionalities or combinations of functionalities set-forth in romanettes (i)-(ix) appearing in the foregoing paragraphs.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method carried-out utilizing a media receiver, the method comprising:

establishing whether time-sensitive media content is desirably viewed by an end user of the media receiver;

if establishing by a viewing of a predetermined number of views of a set of media content episodes in a series related to the time-sensitive media content, the client media receiver generates a query or a prompt for inquiring whether a reminder notification should be desirably generated for viewing by the end user of an episode of the time-sensitive media content wherein the query solicits input from the end user regarding a time of the notification reminder relative to an availability of the time-sensitive media content to view from one or more content providers;

if establishing that the time-sensitive media content is desirably viewed by the end user, determining whether the reminder notification should be generated for the time-sensitive media content at a specified time relative to a change in availability of the time-sensitive media content from a media content provider comprising when the media content is first broadcast or becomes available to view prior to a removal of the time-sensitive media content from a streaming video platform;

if determining whether time-sensitive media content satisfies an established time-sensitive content notification criteria by searching informational sources comprising information extracted from an electronic program guide for broadcast media, information extracted from metadata or content descriptions for video on demand content, and information extracted from online sources or services accessible via a network;

if determining that a reminder notification should be generated for the time-sensitive media content, then generating the reminder notification at the specified time in accordance with the end user input wherein the reminder notification comprises at least one of a set of reminder notifications comprising: a pre-release reminder and a post-release reminder notification; the generating of the reminder notifications further comprising:

choosing, for the pre-release reminder notification by the end user, a time window and a frequency for the pre-release reminder notification in order to select when a first pre-release reminder notification is generated, whether a subsequent reminder notifications should be issued, and the frequency of the pre-release reminder notification; and determining, by the end user for the post-release notification, a time period for generating additional notifications and a frequency for the post-release reminder notifications.

2. The method of claim 1 wherein determining comprises determining whether the reminder notification should be generated at a specified time before a premiere broadcast of the time-sensitive media content by the media content provider.

3. The method of claim 2 wherein the media receiver comprises a home media receiver located in a residence of the end user;

wherein the method further comprises:

providing a user interface element, as part of the reminder notification, for automatically setting a recording of the premiere broadcast of the time-sensitive media content; and scheduling the home media receiver to record the premiere broadcast of the time-sensitive media content when the user interface element is activated by the end user.

4. The method of claim 3 wherein the reminder notification is generated at a user-carried electronic device, which is operated by the end user and which communicates with the home media receiver over a network; and wherein the user-carried electronic device transmits instructions to the home media receiver over the network to record the premiere broadcast of the time-sensitive media content when the user interface element is activated by the end user.

5. The method of claim 1 wherein determining comprises determining whether the reminder notification should be generated following release of time-sensitive media content by the media content provider on a streaming video platform.

6. The method of claim 5 further comprising:

identifying one or more streaming video platforms to which the end user subscribes; and generating the reminder notification in response to determining that the time-sensitive media content is pending release on a streaming video platform to which the user subscribes.

7. The method of claim 5 further comprising:

determining whether payment of a one-time fee is required to view the time-sensitive media content; and if determining that one-time fee is required to view the time-sensitive media content, generating the notification requirement only if user data indicates that reminder notifications should be generated regardless of whether a one-time fee is required to view the media content.

8. The method of claim 1 wherein determining comprises determining whether the reminder notification should be generated prior to removal of the time-sensitive media content from a video streaming platform associated with the media content provider.

9. The method of claim 8 wherein the media receiver comprises a home media receiver located in a residence of the end user;

wherein the method further comprises:

providing a user interface element, as part of the reminder notification, for automatically scheduling a recording of the time-sensitive media content; and scheduling the home media receiver to record the time-sensitive media content prior to removal from the video streaming platform when instructed via user input entered via the user interface element.

10. The method of claim 9 wherein the reminder notification is generated at a user-carried electronic device, which is operated by the end user and which communicates with the home media receiver over a network; and wherein the user-carried electronic device transmits instructions to the home media receiver over the network to record the time-sensitive media content prior to removal from the video streaming platform when the user interface element is activated by the end user.

11. A method carried-out utilizing a media receiver operated by an end user, the method comprising:

determining whether high interest media content is pending removal from a streaming video platform to which the end user subscribes;

if determining that high interest media content is pending removal from a streaming video platform to which the end user subscribes, determining whether a reminder notification should be generated for the high interest media content at a specified time prior to removal of the high interest media content from the streaming video platform;

if determining by a viewing of a predetermined number of views of a set of media content episodes in a series related to the high interest media content, the media receiver generates a query or a prompt for inquiring whether a reminder notification should be desirably generated for viewing by the end user of an episode of the high interest media content wherein the query solicits input from the end user regarding a time of the notification reminder relative to an availability of the high interest media content to view from one or more content providers;

if determining whether high interest content satisfies an established time-sensitive content notification criteria by searching informational sources comprising information extracted from an electronic program guide for broadcast media, information extracted from metadata or content descriptions for video on demand content, and information extracted from online sources or services accessible via a network; and if determining that the reminder notification should be generated for the high interest media content, then generating the reminder notification at the specified time in accordance with the end user input wherein the reminder notification comprises at least one of a set of reminder notifications comprising: a pre-release reminder and a post-release reminder notification, the generating of the reminder notifications further comprising:

choosing, for the pre-release reminder notification by the end user, a time window and a frequency for the pre-release reminder notification in order to select when a first pre-release reminder notification is generated, whether a subsequent reminder notifications should be issued, and the frequency of the pre-release reminder notification; and determining, by the end user for the post-release notification, a time period for generating additional notifications and a frequency for the post-release reminder notifications.

12. The method of claim 11 wherein generating the reminder notification comprises transmitting, from the media receiver to a user-carried electronic device, instructions to generate the notification reminder.

13. A media receiver, comprising:

a processor; and a non-transitory, computer-readable medium containing instructions thereon, which, when executed by the processor, causes the media receiver to perform the operations of:

establishing whether time-sensitive media content is desirably viewed by an end user of the media receiver;

if establishing that time-sensitive media content is desirably viewed by the end user, determining whether a reminder notification should be generated for the time-sensitive media content at a specified time relative to a change in availability of the time-sensitive media content from a media content provider;

if establishing by a viewing of a predetermined number of views of a set of media content episodes in a series related to the high interest media content whether the client media receiver should generate a query or a prompt for inquiring whether a reminder notification is desirably generated for viewing by the end user of an episode of the high interest media content wherein the query solicits input from the end user regarding a time of the notification reminder relative to an availability of the time-sensitive media content to view from one or more content providers;

if determining whether time-sensitive media content satisfies an established time-sensitive content notification criteria by searching informational sources comprising information extracted from an electronic program guide for broadcast media, information extracted from metadata or content descriptions for video on demand content, and information extracted from online sources or services accessible via a network; and if determining that the reminder notification should be generated for the time-sensitive media content, then generating the reminder notification at the specified time in accordance with the end user input wherein the reminder notification comprises at least one of a set of reminder notifications comprising: a pre-release reminder and a post-release reminder notification, the generating of the reminder notifications further comprising:

choosing, for the pre-release reminder notification by the end user, a time window and a frequency for the pre-release reminder notification in order to select when a first pre-release reminder notification is generated, whether a subsequent reminder notifications should be issued, and the frequency of the pre-release reminder notification; and determining, by the end user for the post-release notification, a time period for generating additional notifications and a frequency for the post-release reminder notifications.

14. The media receiver of claim 13 wherein, when the computer-readable code is executed by the processor, the media receiver further performs the operation of:

determining whether the reminder notification should be generated at a specified time before a premiere broadcast of the time-sensitive media content by the media content provider.

15. The media receiver of claim 14 wherein the media receiver comprises a home media receiver located in a residence of the end user;

wherein, when the computer-readable code is executed by the processor, the media receiver further performs the operations of:

providing a user interface element, as part of the reminder notification, for automatically setting a recording of the premiere broadcast of the time-sensitive media content; and scheduling the home media receiver to record the premiere broadcast of the time-sensitive media content when the user interface element is activated by the end user.

16. The media receiver of claim 13 wherein, when the computer-readable code is executed by the processor, the media receiver further performs the operation of:

determining whether the reminder notification should be generated following release of time-sensitive media content by the media content provider on a streaming video platform.

17. The media receiver of claim 16 wherein, when the computer-readable code is executed by the processor, the media receiver further performs the operations of:

identifying one or more streaming video platforms to which the end user subscribes; and generating the reminder notification in response to determining that the time-sensitive media content is pending release on a streaming video platform to which the user subscribes.

18. The media receiver of claim 16 wherein, when the computer-readable code is executed by the processor, the media receiver further performs the operations of:

determining whether payment of a one-time fee is required to view the time-sensitive media content;

if determining that one-time fee is required to view the time-sensitive media content, further determining from user data whether reminder notification should be generated for media content requiring payment of a one-time fee to view; and generating the reminder notification if the user data indicates that reminder notifications should be generated regardless of whether a one-time fee is required to view the media content.

19. The media receiver of claim 13 wherein, when the computer-readable code is executed by the processor, the media receiver further performs the operation of:

determining whether the reminder notification should be generated prior to removal of the time-sensitive media content from a video streaming platform operated by the media content provider.

20. The media receiver of claim 19 wherein the media receiver comprises a home media receiver located in a residence of the end user;

wherein, when the computer-readable code is executed by the processor, the media receiver further performs the operations of:

providing a user interface element, as part of the reminder notification, for automatically scheduling a recording of the time-sensitive media content; and scheduling the home media receiver to record the time-sensitive media content prior to removal from the video streaming platform when instructed via user input entered via the user interface element.

\* \* \* \* \*